(12) United States Patent
Byrd et al.

(10) Patent No.: US 11,890,915 B2
(45) Date of Patent: Feb. 6, 2024

(54) ULTRA-LOW PROFILE HVAC APPARATUS FOR A VEHICLE

(71) Applicant: Webasto SE, Stockdorf (DE)

(72) Inventors: Charles Massimo Byrd, Molinella (IT); Roberto Galasso, Molinella (IT); Marco Brunaldi, Molinella (IT)

(73) Assignee: WEBASTO SE, Stockdorf (DE)

( * ) Notice: Subject to any disclaimer, the term of this patent is extended or adjusted under 35 U.S.C. 154(b) by 236 days.

(21) Appl. No.: 16/762,878

(22) PCT Filed: Nov. 10, 2017

(86) PCT No.: PCT/IT2017/000249
§ 371 (c)(1),
(2) Date: May 8, 2020

(87) PCT Pub. No.: WO2019/092758
PCT Pub. Date: May 16, 2019

(65) Prior Publication Data
US 2020/0282799 A1    Sep. 10, 2020

(51) Int. Cl.
*B60H 1/00* (2006.01)
*B60H 1/26* (2006.01)

(52) U.S. Cl.
CPC ..... *B60H 1/00457* (2013.01); *B60H 1/00335* (2013.01)

(58) Field of Classification Search
CPC ............ B60H 1/00457; B60H 1/00335; B60H 1/0028
USPC ........................................................ 454/139
See application file for complete search history.

(56) References Cited

U.S. PATENT DOCUMENTS

| | | | |
|---|---|---|---|
| 6,341,648 B1 * | 1/2002 | Fukuoka | B21C 37/151 237/12.3 B |
| 6,718,784 B1 | 4/2004 | Bushnell | |
| 8,978,412 B2 | 3/2015 | Ahn et al. | |
| 2006/0254291 A1 | 11/2006 | Allen et al. | |
| 2009/0025904 A1 * | 1/2009 | Tokunaga | B60H 1/00028 165/104.34 |
| 2015/0369546 A1 | 12/2015 | Nakashima et al. | |
| 2016/0359211 A1 | 12/2016 | Kenney et al. | |

FOREIGN PATENT DOCUMENTS

| | | |
|---|---|---|
| DE | 3317510 A1 | 11/1984 |
| DE | 3406249 A1 | 8/1985 |
| DE | 10156882 A1 | 8/2002 |
| DE | 10162872 A1 | 8/2003 |

(Continued)

OTHER PUBLICATIONS

International Searching Authority. International Search Report and Written Opinion for application PCT/IT2017/000249, dated Aug. 8, 2018.

*Primary Examiner* — Davis D Hwu
(74) *Attorney, Agent, or Firm* — Quarles & Brady LLP

(57) ABSTRACT

A HVAC apparatus 10 for a vehicle 12 having a fan unit 14 with a plurality of axial impellers 16 driven by motors 18 mounted in their centers, wherein the axial impellers rotational axis is substantially perpendicular to the fan unit's suction direction, a heat exchanger unit 20 forming an air duct receiving air from the fan unit, and a plate-shaped housing accommodating the fan unit and the heat exchanger unit.

19 Claims, 7 Drawing Sheets

(56) References Cited

FOREIGN PATENT DOCUMENTS

| | | |
|---|---|---|
| DE | 102015213012 A1 | 1/2017 |
| DE | 102016105835 A1 | 10/2017 |
| EP | 2314957 A2 | 4/2011 |
| EP | 2554411 A1 | 2/2013 |
| JP | 2006001468 A * | 1/2006 |
| WO | 2015131235 A1 | 9/2015 |

* cited by examiner

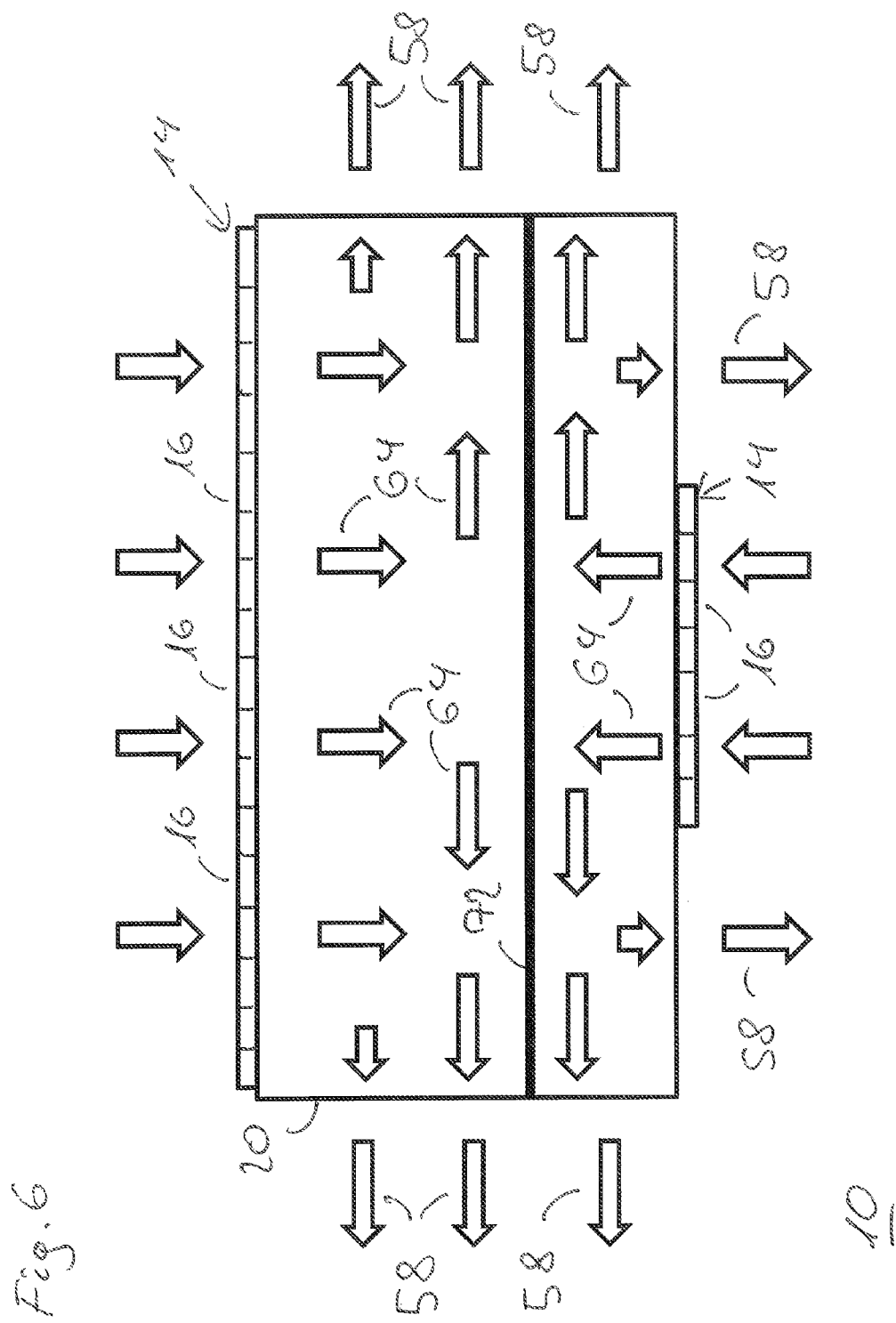

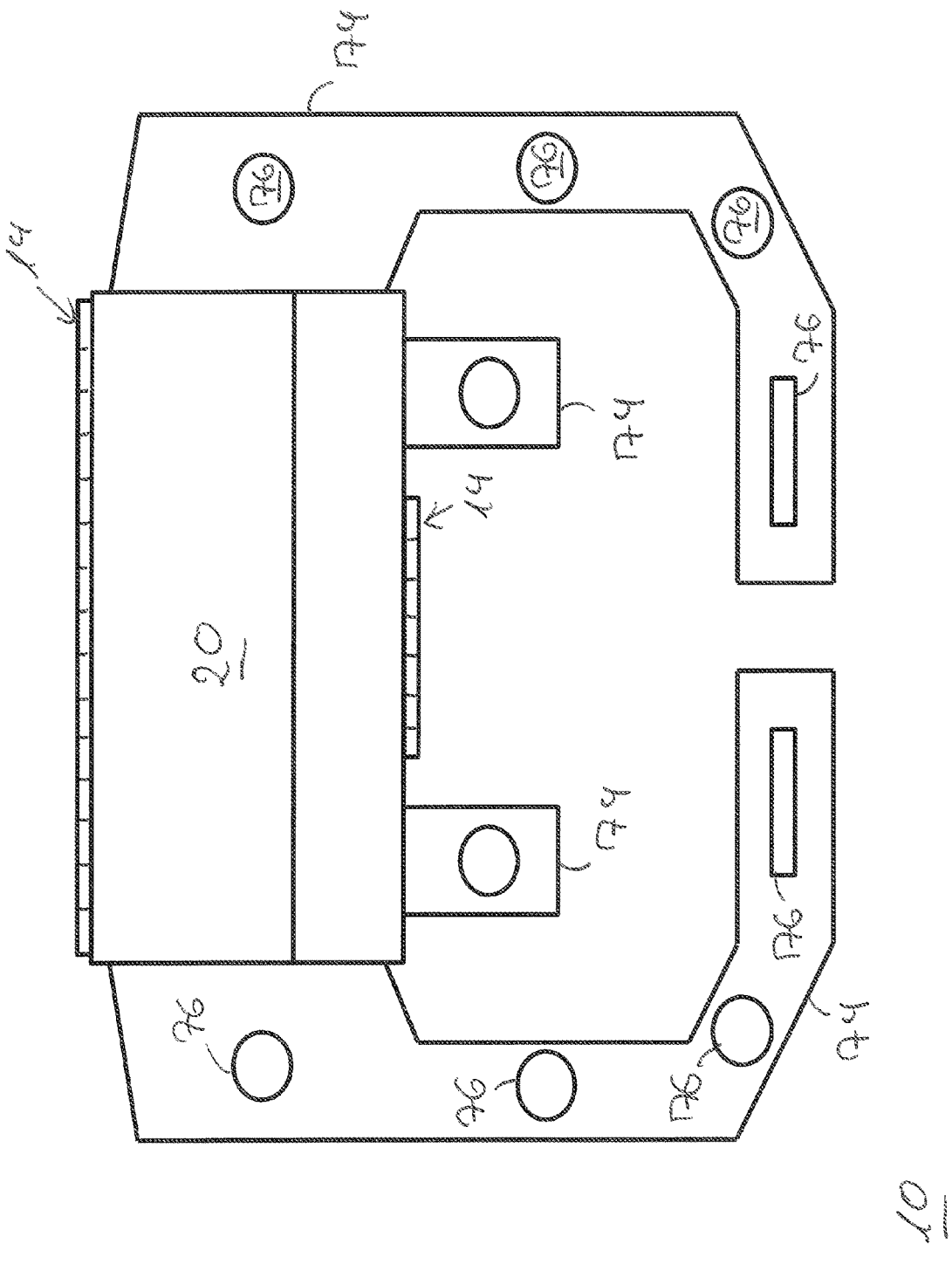

ULTRA-LOW PROFILE HVAC APPARATUS FOR A VEHICLE

This application represents the national stage entry of PCT International Application No. PCT/IT2017/000249 filed Nov. 10, 2017, which is hereby incorporated herein by reference for all purposes.

The present disclosure relates to an ultra-low profile HVAC apparatus for a vehicle.

HVAC apparatuses having a large profile height usually provide more cooling power and/or a higher energy efficiency than HVAC apparatuses with a low profile height. However, the usage of a HVAC apparatus with a large profile height leads to a significant reduced valuable head height, head room and visibility from the cabin. It is also undesired to raise the roof height in order to avoid building/structure clearances issues and enlarging the vehicles aerodynamic drag. On the other hand, sufficient cooling power as well as enough fan capacity is required for cooling the vehicle's entire driver cabin and dealing with long air ducts in the vehicle. This is a demand which leads away from an ultra-low profile design. Thus, common HVAC apparatuses for mobile applications, in particular for cooling a vehicle's driver cabin, have a minimum profile height of about 120 to 180 mm.

Therefore, there is a strong desire to provide a HVAC apparatus having a lower profile height while providing a high efficiency as well as sufficient cooling power for cooling a vehicle's driver cabin.

It is the object of the present disclosure to provide a HVAC apparatus with sufficient cooling power for cooling a vehicle's driver cabin, the HVAC apparatus having a high efficiency and an ultra-low profile height. These objects are solved by the features of the independent claim. Advantageous embodiments arise from the dependent claims.

The described HVAC apparatus for a vehicle has a fan unit, a heat exchanger unit, and a plate-shaped housing accommodating the fan unit and the heat exchanger unit. The fan unit has a plurality of axial impellers driven by motors mounted in their centers. The heat exchanger unit forms an air duct receiving air from the fan unit. The axial impellers can have a rotational axis substantially perpendicular to the fan unit's suction direction. The fan unit's suction direction can be defined by the normal direction of the plate-shaped housing. The plate-shaped housing can be, for example, a part of a vehicle's roof construction of a separate casing small enough to fit into a vehicle's roof construction. Thus, the fan unit sucks in air from the cabin's interior, resulting in a fan unit's suction direction perpendicular to the rotational axis of the axial impellers. Further, a casing of the fan unit, for example, a support construction for fixation of the axial impellers, can be viewed as part of the plate-shaped housing. The suction air can be fresh air, cabin air, or a mixture of both. Inside of the plate-shaped housing, the suction air can be blown from the fan unit's axial impellers directly into the heat exchanger unit. This mechanical configuration allows for low profile height layouts because all relevant components of the HVAC apparatus can be arranged side by side and the fan unit's relevant profile height is also low due to the usage of a plurality of axial impellers. Further, the HVAC apparatus can be integrated in a vehicle's roof structure without thickening the roof structure.

Each of the plurality of axial impellers may be allocated to an outlet guide vane. Using an outlet guide vane with each of the axial impellers can improve the homogeneity of the provided air stream and can also allow a higher pressure drop in the HVAC apparatus.

The heat exchanger unit may comprise a heat exchanger having at least two different cooling regions with different working temperatures through which received air flows consecutively, and wherein the different working temperatures are controlled by a temperature control unit. The temperature control unit can comprise the necessary control logic for operation of the HVAC apparatus as well as components of a usual cooling circuit. The term "control logic" can refer to a mechanical object that executes a feedback control based on physical values, e.g., pressure and/or temperature. The temperature control unit can be accommodated in the plate-shaped housing. The temperature control unit can control the different working temperatures individually. In this regard, the term "individually" can mean that the working temperatures for each cooling region can change due to an (automatic) regulatory cycle for maintaining the efficiency of the heat transfer process independently from the working temperatures in other cooling regions. Providing a heat exchanger having at least two different cooling regions with different working temperatures, to which received air flows consecutively, provides for an optimized equilibrium temperature gradient between the air stream inside of the heat exchanger and a heat transfer surface of the heat exchanger. The optimized equilibrium temperature gradient increases the provided energy efficiency at a given cooling power. The optimized equilibrium temperature gradient can be a constant value over all cooling regions. Thus, the overall dimensions of the provided HVAC apparatus can be reduced while maintaining the delivered cooling power and a high efficiency. The working temperatures of the different working regions are a measure for the equilibrium temperature gradient. For example, the working temperature of a specific cooling region can be the equilibrium temperature of the heat transfer surface at a specific surface point in this cooling region. The different working temperatures decrease from cooling region to cooling region, wherein the cooling region that is initially in contact with the air stream has the highest working temperature. The provided optimization of the equilibrium temperature gradient throughout the complete heat exchanger contributes to heat exchanger layouts having an ultra-thin profile height of about 40 mm while maintaining the delivered cooling power at a high efficiency.

The temperature control unit may comprise at least two thermal expansion valves with different refrigerant flow rates at a given condition. The term "given condition" can refer to a sensed temperature that is used for controlling the opening/closing of the thermal expansion valve in a self-regulatory manner. In this way, different working temperatures in different cooling regions of the heat exchanger can be controlled and optimized in an easy way. Higher refrigerant flow rates provided by a thermal expansion valve lead to a reduced working temperature in the cooling region of the heat exchanger connected to this thermal expansion valve compared to another cooling region of the heat exchanger that is connected to another thermal expansion valve providing a lower refrigerant flow rate. The thermal expansion valves execute an automatic temperature driven regulatory cycle. The regulatory cycle can be modified by mechanically adjusting the valve's characteristic. This can be advantageous, for example, when using the HVAC apparatus in climate zones that have different ambient temperatures.

The temperature control unit may comprise at least one thermal expansion valve with a common refrigerant inlet and at least two refrigerant outlets, providing different refrigerant flow rates to the at least two different cooling regions. Similar to the previously described usage of at least two thermal expansion valves with different refrigerant flow rates at a given condition, at least some of these thermal expansion valves can be unified for simplifying the mechanical setup of the HVAC apparatus.

Further, the temperature control unit may comprise at least two heat pipes with different evaporation points, wherein the at least two heat pipes are connected to different cooling regions of the heat exchanger. Heat pipes are an alternative possibility for individually adjusting the working temperatures of different cooling regions for providing an optimized equilibrium temperature gradient between the surface of the heat exchanger and the air stream. The different evaporation points fulfill the same task as the different flow rates of the thermal expansion valves. However, it is not possible to modify the evaporation points for adapting the HVAC apparatus.

In this regard, the at least two heat pipes may be connected to a common cold reservoir. The cold reservoir can be provided by a single simple cooling circuit of the HVAC apparatus that may be at least partly integrated in the temperature control unit.

The at least two cooling regions may be thermally isolated from each other. A thermal isolation between the at least two cooling regions can stabilize the equilibrium temperature gradient profile within the heat exchanger because the different cooling regions do not directly interact with each other. This reduces the required control logic and simplifies the implementation of different cooling outputs of the HVAC apparatus while maintaining the desired high efficiency.

On the other hand, it may be possible to thermally connect the at least two cooling regions to each other which provides a more compact HVAC apparatus because the size of the heat exchanger can be further reduced.

An overall profile height of the HVAC apparatus may be less than or equal to 80 mm, preferably less than or equal to 60 mm, particularly less than or equal to 50 mm. The overall profile height of the HVAC apparatus is substantially defined by the profile height of the plate-shaped housing. A smaller overall profile height simplifies the integration of the HVAC apparatus in a vehicle's roof construction without thickening the roof.

The disclosure will be explained in more detail with reference to the appended drawings. In the drawings, the same merits designate identical or similar components. The actual quantity of connections and different cooling regions depicted in the figures can be freely adapted and the described embodiments are intended for understanding the basic principle of the present disclosure without restricting the number of cooling regions to a specific depicted case.

FIG. 6 shows a second schematic top view of an open HVAC apparatus; and

FIG. 7 shows a schematic bottom view of a HVAC apparatus.

Figure 1:
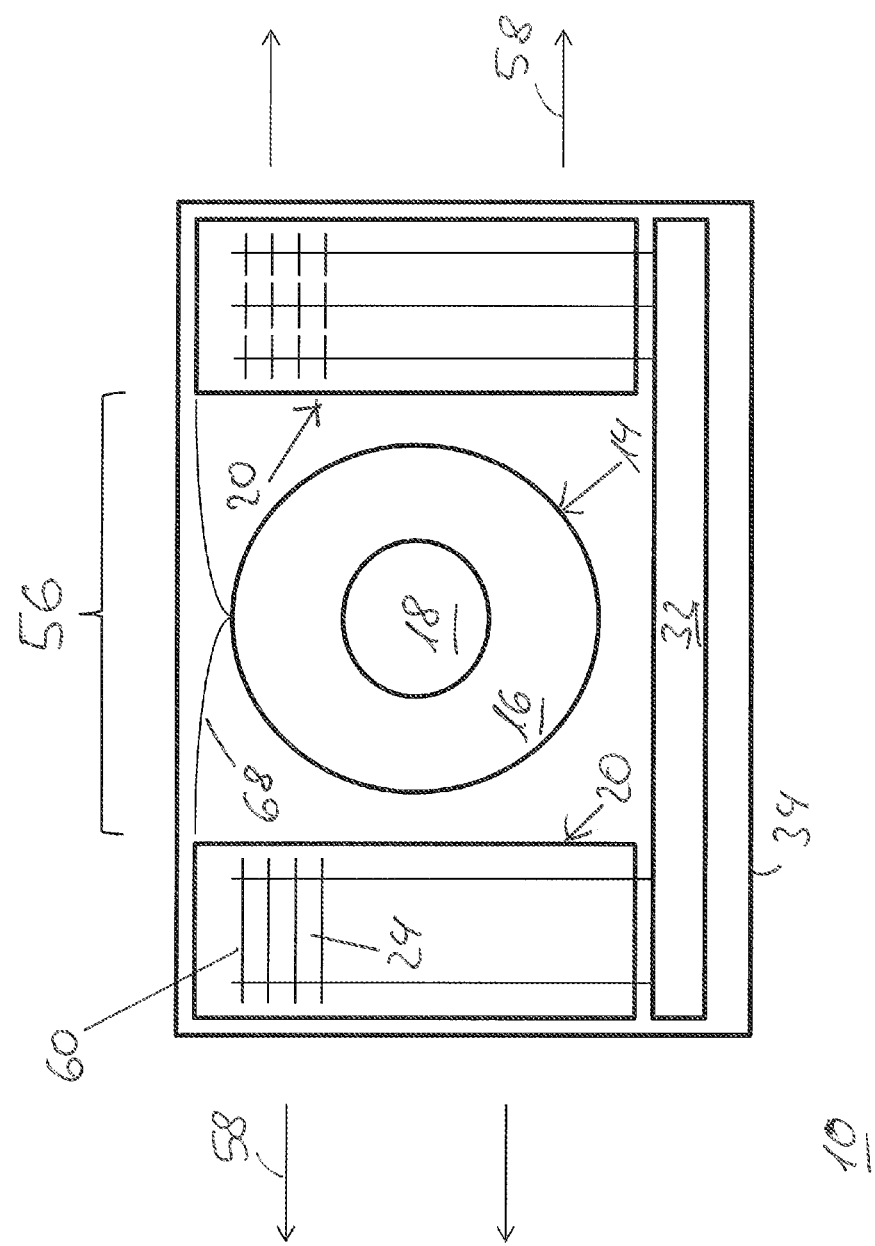
FIG. 1 shows a schematic top view of an unclaimed open HVAC apparatus.

FIG. 1 shows a schematic open top view of an unclaimed open HVAC apparatus 10. The unclaimed HVAC apparatus 10 shown in FIG. 1 is used to illustrate some basic aspects that are also relevant for the present disclosure. The HVAC apparatus 10 has a fan unit 14, a heat exchanger unit 20, and a temperature control unit 32. The fan unit 14, the heat exchanger unit 20, and the temperature control unit 32 are all accommodated within a plate-shaped housing 34. The fan unit 14 consists of an annular impeller 16 and a motor 18 which are arranged in the center of the annular impeller 16. The annular impeller has a plurality of blades that are not shown. The heat exchanger unit 20 has two separate substantially cuboid parts that are mounted near opposite rims of the plate-shaped housing 34. The space between the two separate substantially cuboid parts of the heat exchanger unit 20 is a central recess 56. The fan unit 14 is mounted in the central recess 56. The fan unit 14 generates an air stream that is equalized distributed by a plurality of air baffles 68 located in the remaining gap between the fan unit 14 and the heat exchanger unit 20. Only two air baffles 68 are shown in the figure for simplicity reasons. The air stream enters air ducts 24 inside of the heat exchanger unit 20. The air ducts 24 may be for example formed by heat transfer fins 60 that substantially define the internal surface of the heat exchanger unit 20. The air stream subsequently leaves the heat exchanger unit 20 as a conditioned air stream 58 in the shown directions.

The heat exchanger unit 20 is connected with the temperature control unit 32, wherein the connections provide at least two different working temperatures in different cooling regions of the heat exchanger unit 20 as will be explained later on. In the figure, the left part of the heat exchanger unit 20 has two connections with the temperature control unit 32. The heat transfer fins 60 are thermally connecting the resulting two different cooling regions. These different cooling regions are maintained at the desired different working temperatures via the connections by the temperature control unit 32. The connections can be formed for example by evaporators or heat pipes as will be explained later. Quite similar, the right part of the heat transfer unit 20 has three connections with the temperature control unit 32 and this part of the heat exchanger unit 20 has three different cooling regions that are maintained at three different working temperatures via the three connections to the temperature control unit 32. The heat transfer fins 60 in these three different cooling regions of the right part of the heat transfer unit 20 are thermally isolated from each other which is indicated by the gaps between the different parts of the heat transfer fins 60.

Besides the cooling function of the heat transfer unit 20, it is possible to implement a heating function by adding an additional heating element. Such a heating element can be used to establish a so called "reheating mode" for reducing the amount of water vapor in the conditioned air.

Figure 2:
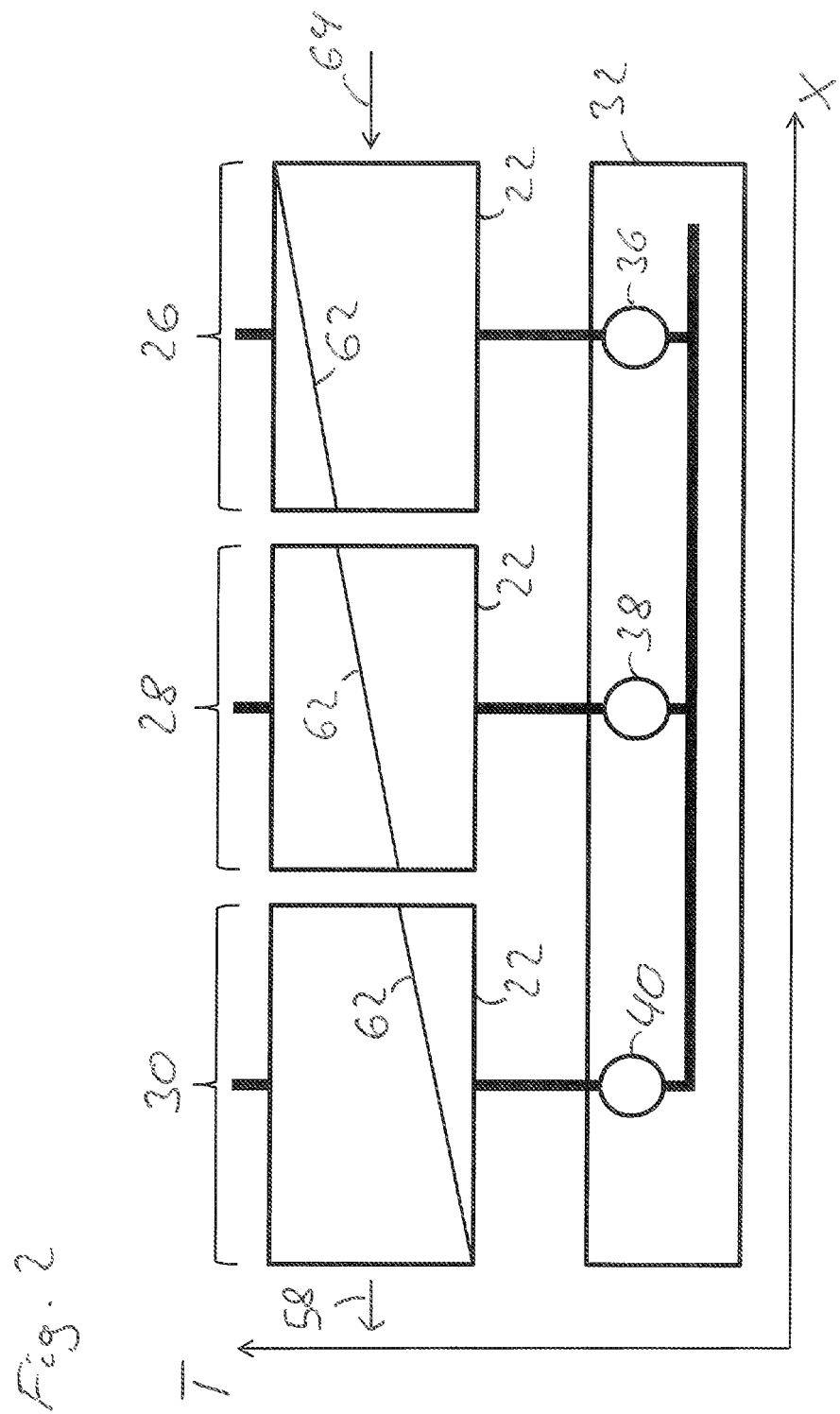
FIG. 2 shows a schematic open side view of a heat exchanger and a connected temperature control unit.

FIG. 2 shows a schematic open side view of a heat exchanger 22 and a connected temperature control unit 32. The heat exchanger 22 of the heat exchanger unit 20 has three parts providing a first cooling region 26, a second cooling region 28, and a third cooling region 30. The first cooling region 26, the second cooling region 28, and the third cooling region 30 are connected to the temperature control unit 32. The temperature control unit 32 comprises inter alia a first thermal expansion valve 36, a second thermal expansion valve 38, and a third thermal expansion valve 40. The first thermal expansion valve 36 controls the refrigerant flow to the first cooling region 26 of the heat exchanger 22. The second thermal expansion valve 38 controls the refrigerant flow to the second cooling region 28 of the heat exchanger 22. The third thermal expansion valve 40 controls the refrigerant flow to the third cooling region 30 of the heat exchanger 22. An air stream 64 provided by the fan unit 14 enters the heat exchanger 22 at its right side and leaves the heat exchanger at the left side as conditioned air 58 after subsequently flowing through the first cooling region 26, the second cooling region 28, and the third cooling region 30. Thus, the air stream 64 initially enters the first cooling region 26. The connection of the first cooling region 26 to the temperature control unit 32 is via the first thermal expansion valve 36, which controls the amount of refrigerant flowing to this part of the heat exchanger 22. The connection itself is a line that acts as an evaporator for the refrigerant flowing through the first thermal expansion valve 36.

A temperature gradient between the air stream 64 and the surface of the heat exchanger 22 in the first cooling region 26 substantially depends on the refrigerant flow rate through the first thermal expansion valve 36. Generally, the temperature of the air stream 64 diminishes from the right to the left as indicated by a temperature curve 62 depicted in the part of the heat exchanger 22 that corresponds to the first cooling region 26. The temperature gradient between the air stream 64 and the surface of the heat exchanger 22 is kept almost constant. The situation is quite similar for the second cooling region 28 that is fed with refrigerant by the second thermal expansion valve 38 and the third cooling region 30 that is fed with refrigerant by the third thermal expansion valve 40.

The slightly cooled air stream 64 enters the second cooling region 28 after leaving the first cooling region 26. The second thermal expansion valve 38 provides different refrigerant flow rate compared to the first thermal expansion valve 36 that is connected to the first cooling region 26 of the heat exchanger 22. The surface of the heat exchanger 22 in the second cooling region 28 is kept cooler than the surface of the heat exchanger 22 in the first cooling region 26. However, the temperature gradient between the air stream 64 and the surface of the heat exchanger 22 in the second cooling region 28 is as large as the corresponding temperature gradient in the first cooling region 26 because the temperature of the air stream 64 is already reduced by the first cooling region 26. In other words, the working temperatures are different but the temperature gradient is constant. Quite similar, the temperature of the heat exchangers surface reduces even further in the third cooling region 30 due to a different refrigerant flow rate provided by the third thermal expansion valve 40. This leads to a constant temperature gradient throughout the heat exchanger 22. This is an indication of an overall highly efficient cooling of the air stream 64 as the optimized temperature profile resembles a desired temperature profile of a classical counter flow heat exchanger.

The temperature control unit 32 comprises inter alia common components of a cooling circuit. Of course, refrigerant provided via the thermal expansion valves 36, 38, 40 to the different cooling regions 26, 28, 30 of the heat exchanger 20 evaporates and is fed back into the temperature control unit 32 to close the cooling circuit. However, this is not shown in the figure.

Figure 3:
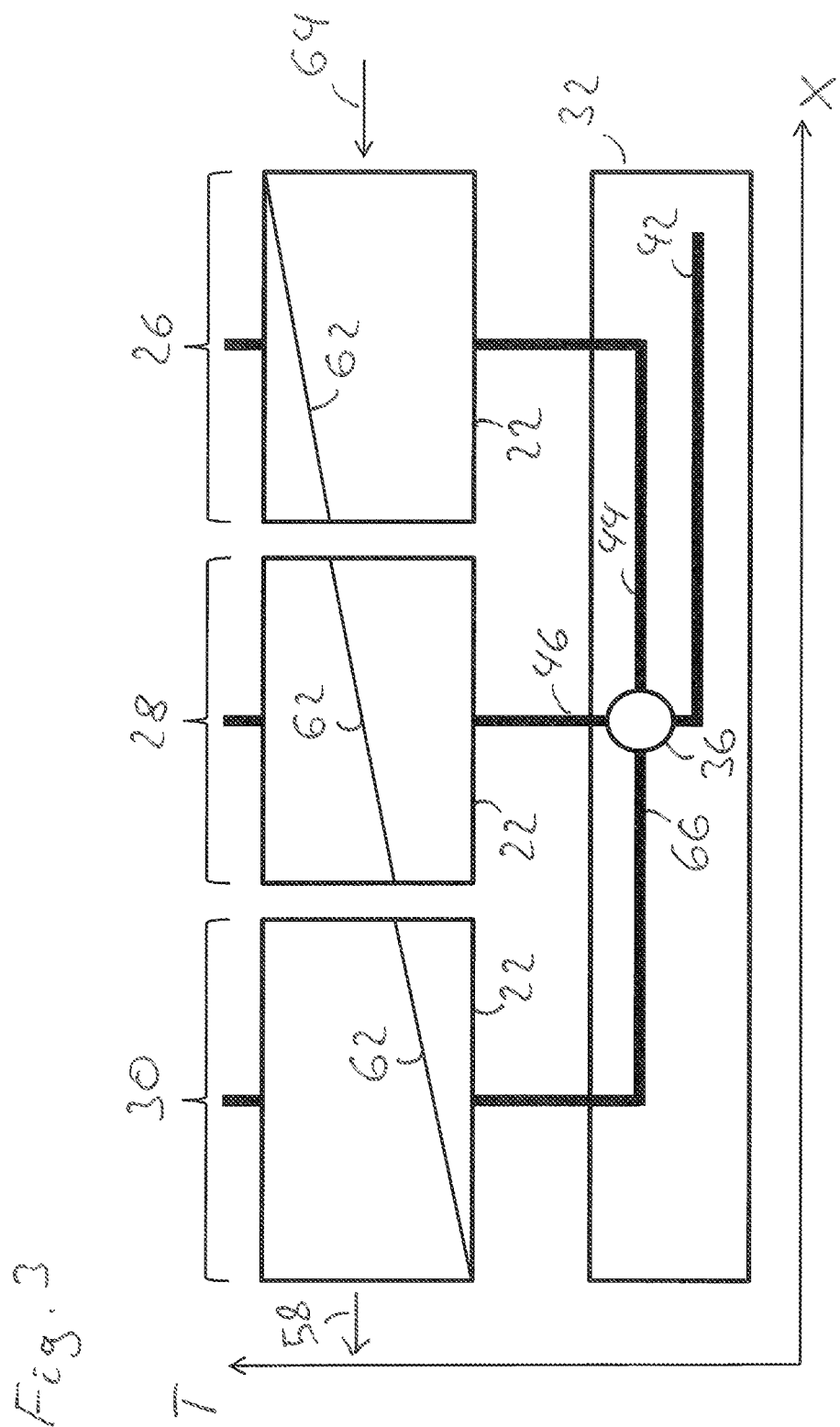
FIG. 3 shows a second schematic open side view of a heat exchanger and a connected temperature control unit.

FIG. 3 shows a schematic side view of a heat exchanger 22 and a connected temperature control unit 32. Wide parts of FIG. 3 are identical with FIG. 2. However, the first cooling region 26, the second cooling region 28, and the third cooling region 30 are connected with the cooling circuit of the temperature control unit 32 via a single thermal expansion valve 36 having a common refrigerant inlet 42 and three separate refrigerant outlets 44, 46, 66. Each of the three refrigerant outlets 44, 46, 66 can lead different amounts of refrigerant to the different cooling regions 26, 28, 30 of the heat exchanger 22. In this specific embodiment shown in FIG. 3, working temperature of the first cooling region 26 is higher than the working temperature of the second cooling region 28. Further, the working temperature of the second cooling region 28 is higher than the working temperature of the third cooling region 30. Using a single thermal expansion valve 36 with a plurality of refrigerant outlets 44, 46, 66 can help to simplify the cooling circuit.

Figure 4:
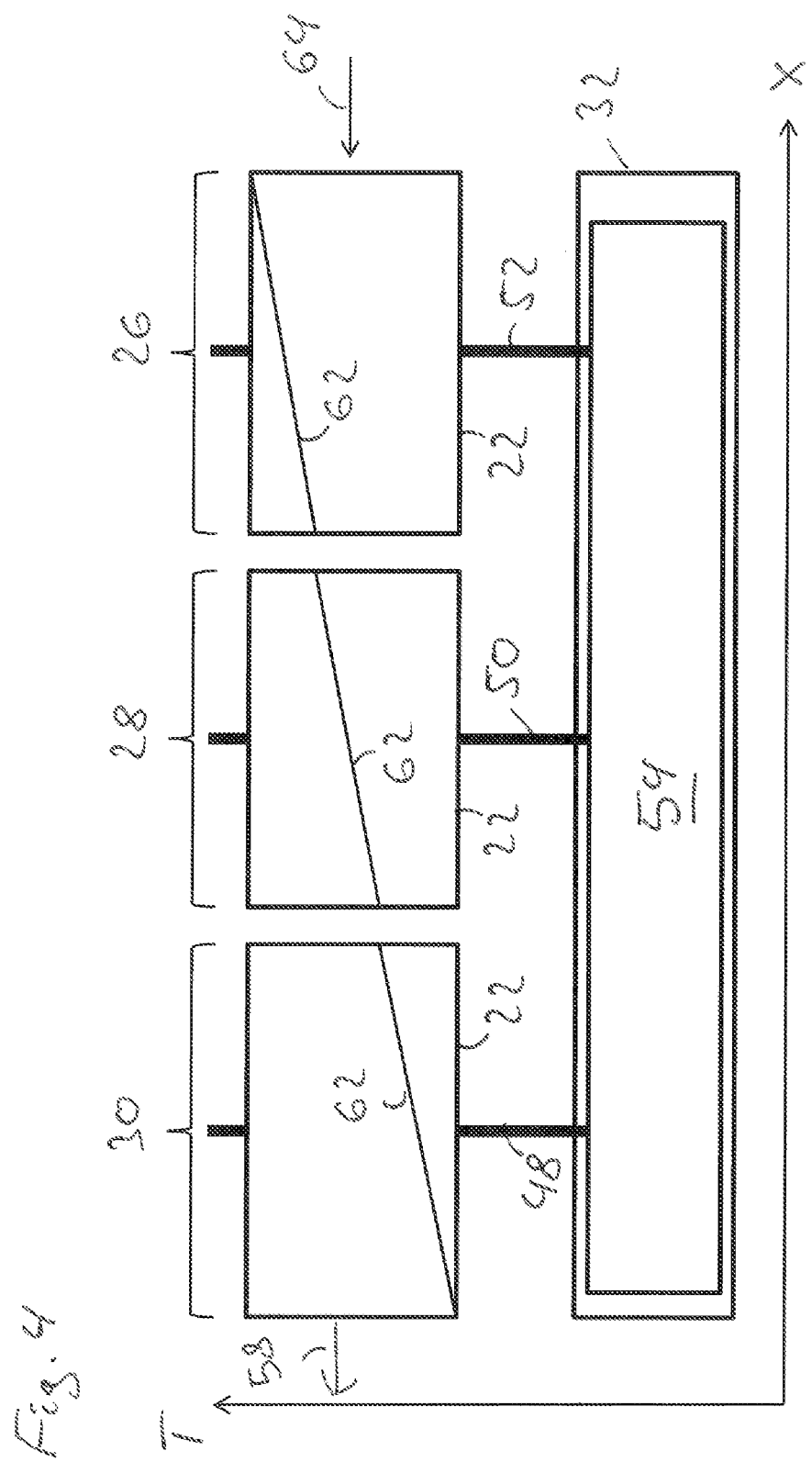
FIG. 4 shows a third schematic open side view of a heat exchanger and a connected temperature control unit.

FIG. 4 shows a third side view of a heat exchanger 22 connected to a temperature control unit 32. Wide parts of FIG. 4 are identical with the previously described FIGS. 2 and 3. However, the temperature control unit 32 comprises a common cold reservoir 54 as part of the cooling circuit. The first cooling region 26 of the heat exchanger 22 is connected to this common cold reservoir 54 via a first heat pipe 52. The second cooling region 28 of the heat exchanger 22 is connected to the common cold reservoir 54 via a second heat pipe 50. The third cooling region 30 of the heat exchanger 22 is connected to the common cold reservoir 54 via a third heat pipe 48. The first heat pipe 52, the second heat pipe 50, and the third heat pipe 48 have different evaporation points. In this way, the first cooling region 26, the second cooling region 28, and the third cooling region 30 are kept on different working temperatures. The effect of the three heat pipes 48, 50, 52 is therefore quite similar to the effect previously described in connection with the usage of thermal expansion valves in FIGS. 2 and 3. The temperature gradient between the air stream 64 and the surface of the heat exchanger 22 is kept almost constant. The common cold reservoir 54 is part of an ordinary cooling circuit that cools the common cold reservoir 54.

Figure 5:
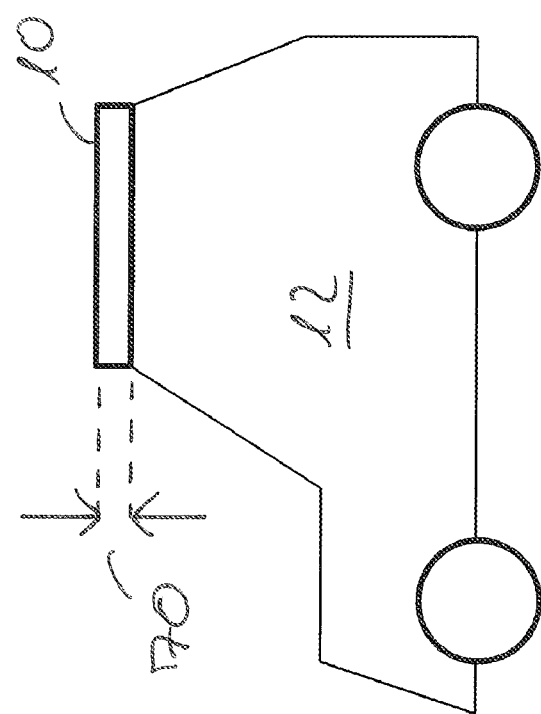
FIG. 5 shows a schematic illustration of a vehicle using an ultra-low profile HVAC apparatus.

FIG. 5 shows a schematic side view of a vehicle 12 using a low-profile HVAC apparatus 10 mounted on the cabin roof. The HVAC apparatus 10 uses the technical principles as herein described and has a profile height 70 that is very low, for example approximately about 40 mm. The ultra-thin profile height 70 can allow an integration of the HVAC apparatus 10 in the roof structure of the vehicle's driver cabin without thickening the roof structure.

FIG. 6 shows a second schematic top view of an open HVAC apparatus 10. The shown HVAC apparatus 10 has the heat exchanger unit 20 centrally located. The fan unit 14 has two parts separated from each other. Both parts of the fan unit 14 consist of a plurality of axial impellers 16. The upper part of the fan unit has seventeen axial impellers and the lower part has seven axial impellers. However, the exact number of axial impellers 16 is a design choice that depends on the required air stream 64. The shown heat transfer unit has an inner wall 72 that divides the heat transfer unit in two air circuits. Both air circuits can be operated independently from each other by operating the related parts of the heat transfer unit 20 and the fan unit. The inner setup of the heat transfer unit 20 can be similar to the setups described in FIGS. 1 to 5. Therefore, additional remarks on internal air ducts defining the way of the air stream inside of the heat transfer unit 20 and different cooling regions are unnecessary. Each of the plurality of axial impellers 16 can have a dimension of 40×40 mm for example. Thus, the relevant overall profile height of the HVAC apparatus can be reduced down to approximately 40 mm. Each of the plurality of axial impellers 16 can be allocated to an outlet guide vane. The outlet guide vanes can be part of the axial impellers housings. The outlet guide vanes can improve the homogeneity of the provided air stream 64. The air stream 64 is generated by the fan unit 14 and leaves the heat exchanger unit 20 as conditioned air 58. A temperature control unit as described in connection with FIG. 1 is not shown in FIG. 6 for simplifying the picture.

FIG. 7 shows a schematic bottom view of a HVAC apparatus 10. The shown HVAC apparatus 10 has external air ducts 74 that lead the conditioned air 58 away from the heat exchanger unit 20. The conditioned air can leave the external air ducts 74 at provided air outlets 76. As can be seen in FIG. 7, the air outlets 76 are evenly spread. In case that the shown HVAC apparatus is integrated into a vehicle's roof construction, it is possible to effectively provide conditioned air to the entire drivers cabin. Quite similar to FIG. 6, a temperature control unit as described in connection with FIG. 1 is not shown in FIG. 7 for simplifying the picture The features of the disclosure disclosed in the above description, the drawings as well as in the claims may be important for a realization both individually and in any combination.

LIST OF NUMERALS

10 HVAC apparatus
12 vehicle
14 fan unit
16 impeller
18 motor
20 heat exchanger unit
22 heat exchanger
24 air duct
26 first cooling region
28 second cooling region
30 third cooling region
32 temperature control unit
34 plate-shaped housing
36 first thermal expansion valve
38 second thermal expansion valve
40 third thermal expansion valve
42 common refrigerant inlet
44 refrigerant outlet
46 refrigerant outlet
48 third heat pipe
50 second heat pipe
52 first heat pipe
54 common cold reservoir
56 central recess
58 conditioned air
60 heat transfer fin
62 temperature curve
64 air stream
66 refrigerant outlet
68 air baffle
70 profile height
72 wall
74 external air duct
76 air outlet

The invention claimed is:

1. A HVAC apparatus for a vehicle having
a fan unit with a plurality of axial impellers driven by motors mounted in their centers, the axial impellers producing suction in a direction substantially parallel to the rotational axes of the axial impellers;
a heat exchanger unit forming an air duct receiving air from the fan unit, the air duct directing the air received from the fan unit in a direction perpendicular to the rotational axes of the axial impellers; and
a plate-shaped housing accommodating the fan unit and the heat exchanger unit, the housing having a flat base defined by at least a length dimension corresponding to a length of the heat exchanger and a width dimension, wherein both the rotational axes of the axial impellers and the length dimension of the heat exchanger are substantially parallel to the base of the housing, and wherein the height dimension is less than the length dimension, and wherein an overall profile height of the HVAC apparatus is less than or equal to 80 mm.

2. The HVAC apparatus of claim 1, wherein each of the plurality of axial impellers is allocated to an outlet guide vane.

3. The HVAC apparatus of claim 1, wherein the heat exchanger unit comprises a heat exchanger having at least two different cooling regions with different working temperatures through which received air flows consecutively; and wherein the different working temperatures are controlled by a temperature control unit.

4. The HVAC apparatus of claim 3, wherein the temperature control unit comprises at least two thermal expansion valves with different refrigerant flow rates at a given condition.

5. The HVAC apparatus of claim 3, wherein the temperature control unit comprises at least one thermal expansion valve with a common refrigerant inlet and at least two refrigerant outlets providing different refrigerant flow rates to the at least two different cooling regions.

6. The HVAC apparatus of claim 3, wherein the temperature control unit comprise at least two heat pipes with different evaporation points, wherein the at least two heat pipes are connected to different cooling regions of the heat exchanger.

7. The HVAC apparatus of claim 6, wherein the at least two heat pipes are connected to a common cold reservoir.

8. The HVAC apparatus of claim 3, wherein the at least two cooling regions are thermally isolated from each other.

9. The HVAC apparatus of claim 3, wherein the at least two cooling regions are thermally connected to each other.

10. The HVAC apparatus of claim 1, wherein an overall profile height of the HVAC apparatus is less than or equal to 60 mm.

11. The HVAC apparatus of claim 1, wherein an overall profile height of the HVAC apparatus is less than or equal to 50 mm.

12. The HVAC apparatus of claim 1, wherein the plurality of axial impellers consists of more than two axial impellers.

13. The HVAC apparatus of claim 1, wherein the plurality of axial impellers are arranged in a side-by-side configuration, and wherein the height of the housing substantially corresponds to a height of the plurality of side-by-side axial impellers.

14. The HVAC apparatus of claim 1, wherein the housing is configured to be integrated into a roof structure of a motor vehicle.

15. The HVAC apparatus of claim 1, wherein the heat exchanger is arranged in a side by side configuration with the fan unit.

16. The HVAC apparatus of claim 1, wherein the housing is configured to mount within a roof of a motor vehicle with the base extending along a length of the roof and the height within the roof structure.

17. The HVAC apparatus of claim 1, wherein the heat exchanger is in fluid communication with an external air duct, the external air duct comprising at least one air outlet.

18. The HVAC apparatus of claim 17, wherein the external air duct comprises a plurality of air outlets, and wherein the plurality of air outlets are evenly spaced along the external air duct.

19. The HVAC apparatus of claim 1, wherein the rotational axes of the axial impellers are substantially perpendicular to the length dimension of the base.

* * * * *